United States Patent [19]

Yamamoto et al.

[11] Patent Number: 5,021,530

[45] Date of Patent: Jun. 4, 1991

[54] FINELY DIVIDED GELLED POLYMER AND PROCESS FOR PRODUCING THE SAME

[75] Inventors: Kenji Yamamoto, Hiratsuka; Hiraki Tadayoshi, Odawara, both of Japan

[73] Assignee: Kansai Paint Co., Ltd., Hyogo, Japan

[21] Appl. No.: 390,876

[22] Filed: Aug. 8, 1989

[30] Foreign Application Priority Data

Aug. 9, 1988 [JP] Japan ................................ 63-197055
Aug. 9, 1988 [JP] Japan ................................ 63-197056

[51] Int. Cl.$^5$ ............................................... C08F 20/10
[52] U.S. Cl. ................................. 526/323.2; 526/220; 526/222
[58] Field of Search ...................... 526/323.2, 222, 220

[56] References Cited

U.S. PATENT DOCUMENTS

| | | | |
|---|---|---|---|
| 4,150,210 | 4/1979 | Anderson et al. | 526/222 |
| 4,151,146 | 4/1979 | Patella | 526/323.2 |
| 4,514,552 | 4/1985 | Shay et al. | 526/301 |

FOREIGN PATENT DOCUMENTS

| | | | |
|---|---|---|---|
| 0095769 | 12/1983 | European Pat. Off. | 526/323.2 |
| 0292213 | 11/1984 | Japan | 526/323.2 |
| 62-15202 | 1/1987 | Japan. | |
| 63-012334 | 1/1988 | Japan. | |
| 63-091130 | 4/1988 | Japan. | |
| 1034430 | 2/1989 | Japan. | |
| 0696029 | 11/1979 | U.S.S.R. | 526/222 |

*Primary Examiner*—Joseph L. Schofer
*Assistant Examiner*—N. Sarofin
*Attorney, Agent, or Firm*—Wenderoth, Lind & Ponack

[57] ABSTRACT

A finely divided gelled polymer obtained by emulsion polymerizing (a) a polymerizable monomer containing at least two radially polymerizable unsaturated groups in the molecule, and (b) a radically polymerizable unsaturated monomer other than the one mentioned in (a), above in the presence of a reactive emulsifier containing an allyl group in the molecule.

A process for producing a finely divided gelled polymer which comprises emulsion polymerizing (a) a polymerizable monomer containing at least two radically polymerizable unsaturated groups in the molecule, and (b) a radically polymerizable unsaturated monomer other than the one mentioned in (a), above in the presence of a reactive emulsifier containing an allyl group in the molecule, characterized by using a water-soluble azoamide compound as a polymerization initiator.

12 Claims, No Drawings

FINELY DIVIDED GELLED POLYMER AND PROCESS FOR PRODUCING THE SAME

This invention relates to a finely divided gelled polymer and a process for producing the same. More specifically, this invention relates to a finely divided gelled polymer crosslinked internally obtained by emulsion polymerization in the presence of a reactive emulsifier, a cationically electrodepositable polymer crosslinked internally having a hydrolyzable alkoxy silane group and a hydroxyl group, obtained by emulsion polymerization in the presence of a reactive emulsifier, and a process for producing a finely divided gelled polymer excellent in polymerization stability comprising carrying out emulsion polymerization in the presence of a water-soluble azoamide compound as a polymerization initiator. [Prior art]

Finely divided polymers gelled by crosslinking reactions in the particles and processes for producing such polymers have heretofore been well known. For example, there have been known a process for emulsion polymerizing a monomeric mixture comprising a monomer for crosslinking containing at least two ethylenic double bonds in an aqueous medium (British Patent No. 967,051 and European Patent Application No. 259181-A) and a process for obtaining a polymer comprising dispersion polymerizing a monomeric mixture containing glycidyl (meth)acrylate and (meth)acrylic acid in the presence of a dispersion stabilizer in a non-aqueous medium, and simultaneously, reacting these functional groups (U.S. Pat. No. 4,025,473). Especially, as processes for producing a polymer in an aqueous medium using an alkoxy silane monomer, there may be cited a process for obtaining a polymer comprising emulsion polymerizing a mixture of an alkoxy silane monomer with the other monomer in an aqueous medium in the presence of a non-reactive surface active agent (Europen Patent Application No. 153600-A), a process for obtaining a delustered electrodeposition-coated film for aluminum building material which comprises copolymerizing an alkoxy silane monomer, (meth)acrylic acid and the other monomer, dispersing the resulting copolymer in water, and then subjecting the dispersion to electrodeposition coating. (Japanese Laid-Open Patent Publication No, 67396/1984), a water-soluble composition comprising combining an acryl copolymer containing an alkoxy silane group and a carboxyl group with a colloidal silica (Japanese Patent Publication No. 47178/1986) and a process for obtaining a polymer comprising dispersing an acryl copolymer containing an alkoxy silane group and a cationic group in water and crosslinking the resulting dispersed copolymer in the molecule (European Patent Application No. 282000-A).

The finely divided gelled polymers obtained by the conventional processes when added to a paint composition, exert influences over the rheological characteristics and physical characteristics of the, paint composition, resulting in contributing to the improvement in the spraying effect of the paint, prevention of sagging of the coated film and the pattern control of a metallic pigment. However, many of such finely divided gelled polymers are of non-aqueous dispersion, or even if they are dispersed in aqueous medium, they are dispersions obtained by emulsion polymerization in the presence of a non-reactive surface active agent, and adversely affect various properties of the coated film such as water resistance, solvent resistance and chemical resistance.

On the other hand, cationically electrodepositable paints broadly used in various industries centering around the automobile industry have per se excellent rust-inhibiting property, however, the coated film in the edge portion of the object to be coated does not become thick and is inferior in edge covering property. In order to solve this problem, investigations were made in an attempt to apply said finely divided gelled polymer to the cationically electrodepositable paint. Since the known finely divided gelled polymers are dispersions of a anionic or nonionic type, it is usually difficult to apply them to cationically electrodepositable paint. Even if the known finely divided gelled polymers can be applied to the cationically electrodepositable paint, the stability of the electrodeposition coating bath, electrodepositable characteristics, as well as water resistance and corrosion resistance of the coating are impaired. Consequently, a cationically electrodepositable paint containing the known finely divided gelled polymers cannot be applied to the practical uses in this field.

The present inventors have made assiduous investigations to develop a finely divided gelled polymer which would be useful as a vehicle for a paint, and found as a result that a finely divided gelled polymer crosslinked internally incorporated with a group having a surface activity by chemical bond in the surface of the resin is very effective for solving said drawback. This finely divided gelled polymer has a good dispersion stability, and when added to a paint, it is very effective for improving the rheological characteristics and physical characteristics of the paint composition without adversely affecting the various properties of the coated film such as water resistance, solvent resistance and chemical resistance.

Further, the present inventors found that a finely divided gelled polymer crosslinked internally having an alkoxy silane group, a hydroxyl group and a cationic group is useful as a rheology controlling agent of a cationically electrodepositable paint. This polymer has a cationic electrodepositability, does not impair stability of the electrodeposition coating bath and electrodepositable characteristics even when it is added to a cationically electrodepositable paint, does not impair the water resistance, corrosion resistance and smoothness of the surface of the coated film because of crosslinking between particles and crosslinking between the polymer particles with the base resin derived from condensation of a silanol group formed by the hydrolysis of alkoxy silane group with another silanol group and a hydroxyl group at the time of baking , and is very effective for prevention of the cissing and improvement of the edge cover property, the adhesiveness and the chipping resistance of the cationically electrodeposited coated film. This finding has led us to completion of this invention.

Thus, according to one aspect of this invention, there is provided a finely divided gelled polymer which is obtained by emulsion polymerizing (a) a polymerizable monomer having at least two radically polymerizable unsaturated groups in the molecule and (b) a radically polymerizable unsaturated monomer other than the one mentioned in (a) above in the presence of a reactive emulsifier having an allyl group in the molecule.

And, according to another aspect of this invention, there is provided a process for producing a finely divided gelled polymer excellent in polymerization stability which comprises emulsion polymerizing (a) a polymerizable monomer having at least two radically polymerizable unsaturated groups and (b) a radically polymerizable unsaturated monomer other than the one mentioned in (a) above in the presence of a reactive emulsifier having an allyl group in the molecule, characterized by using a water soluble azoamide compound as a polymerization initiator.

Hereinbelow, a further detailed description will be made with reference to a finely divided gelled polymer and a process for producing the same according to this invention.

In this invention, the monomers constituting the finely divided gelled polymer are (a) a polymerizable monomer having at least two radically polymerizable unsaturated groups in the molecule, and (b) a radically polymerizable unsaturated monomer other than the one mentioned in (a) above.

The polymerizable monomer having at least two radically polymerizable unsaturated groups in said (a) [hereinafter referred to as "the monomer (a)"] includes a polymerizable unsaturated monocaboxylic acid ester of a polyhydric alcohol, a polymerizable unsaturated alcohol ester of a polybasic acid and an aromatic monomer substituted with at least two vinyl groups.

Specific examples of the monomer (a) include ethylene glycol diacrylate, ethylene glycol dimethacrylate, triethylene glycol dimethacrylate, tetraethylene glycol dimethacrylate, 1,3-butylene glycol dimethacrylate, trimethylolpropane triacrylate, trimethylolpropane trimethacrylate, 1,4-butanediol diacrylate, neopentyl glycol diacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol dimethacrylate, glycerol diacrylate, glycerol allyloxy dimethacrylate, 1,1,1-trishydroxymethylethane diacrylate, 1,1,1-trishydroxy-methylethane triacrylate, 1,1,1-trihydroxymethylethane dimethacrylate, 1,1,1-trishydroxymethylethane trimethacrylate, 1,1,1-trishydroxymethylpropane diacrylate, 1,1,1-trishydroxymethylpropane triacrylate, 1,1,1-trishydroxymethylpropane dimethacrylate, 1,1,1-trishydroxymethylpropane trimethacrylate, triallyl cyanurate, trially isocyanurate, trially trimellitate, diallyl terephthalate, diallyl phthalate and divinyl benzene.

Of the aforesaid monomers (a), the polymerizable unsaturated monocarboxylic acid ester of a polyhydric alcohol and the aromatic monomer substituted with at least two vinyl monomers are preferable for this invention. Of these, ethylene glycol di(meth)acrylate, triethylene glycol dimethacrylate, tetraethylene glycol dimethacrylate, 1,3-butylene glycol dimethacrylate, 1,4-butanediol diacrylate, neopentyl glycol diacrylate, 1,6-hexanediol diacrylate and divinyl benzene are especially preferable.

The radically polymerizable unsaturated monomer of said (b) [hereinafter referred to as "the monomer (b)"] is another half of the monomers constituting the finely divided gelled polymer of this invention, which includes the monomers belonging to the following groups.

A polymerizable unsaturated vinyl silane monomer containing a vinylic double bond and a hydrolyzable alkoxy silane group:

For example, a compound represented by the general formula $R_3SiX$.

In the formula, X represents a vinylic unsaturated group such as gamma-methacryloxypropyl and R represents an acetoxy group or an alkoxy group having 1 to 8 carbon atoms. Examples of the alkoxy group include besides methoxy, ethoxy, propoxy, butoxy, isobutoxy, pentoxy and hexoxy; methoxymethoxy, ethoxymethoxy, alkoxyallyloxy and ethoxyphenoxy. The preferable R is a methoxy or ethoxy group.

Typical examples of the monomer include vinyl trimethoxysilane, vinyltriethoxysilane, vinyltris(2-methoxyethoxy)silane, gamma-methacryloxypropyl trimethoxysilane and vinyl triacetoxysilanes. Of these, the most preferble is gamma-methacryloxypropyl trimethoxysilane.

A polymerizable unsaturated monomer containing a vinylic double bond and a hydroxyl group:

For example, there may be cited 2-hydroxyethyl (meth)acrylate, hydroxypropyl (meth)acrylate, hydroxybutyl (meth)acrylate, allyl alcohol and methallyl alcohol.

A polymerizable unsaturated monomer containing a carboxyl group:

For example, there may be cited acrylic acid, methacrylic acid, crotonic acid, itaconic acid, maleic acid and fumaric acid.

A nitrogen-containing alkyl (meth)acrylate monomer:

For example, there may be cited dimethyl aminoethyl (meth)ecrylate.

A polymerizable unsaturated amide monomer:

For example, there may be cited acrylamide methacrylamide, N,N-dimethylacrylamide and N,N-dimethylamino propyl acrylamide.

A polymerizable unsaturated nitrile monomer:

For example, there may be cited acrylonitrile and methacrylonitrile.

An alkyl (meth)acrylate monomer;

For example, there may be cited a $(C_1-C_4)$ alkyl ester of (meth)acrylic acid such as methyl (meth)acrylate, ethyl (meth)acrylate, n-butyl (meth)acrylate, 2-ethylhexyl (meth)acrylate and lauryl (meth)acrylate.

A polymerizable unsaturated glycidyl monomer:

For example, there may be cited glycidyl (meth)acrylate,

A polymerizable vinyl aromatic monomer:

For example, there may be cited styrene, alphamethyl styrene, vinyl toluene and t-butyl styrene.

An alpha-olefin monomer:

For example, there may be cited ethylene and

An aliphatic vinyl ester monomer:

For example, there may be cited vinyl acetate and vinyl propionate.

A diene monomer;

For example, there may be cited butadiene and isoprene.

These monomers (b) may be properly selected according to the desired characteristics of the finely divided gelled polymer and may be used singly or in combination of at least two.

The blending ratio of the monomer (a) and the monomer (b) constituting the finely divided gelled polymer of this invention is within the following range.

The monomer (a): 1 to 99% by weight, preferably 3 to 20% by weight

The monomer (b): 1 to 99% by weight, preferably 80 to 97% by weight.

Further, in this invention, a cationic finely divided gelled polymer which is especially useful as a rheology controlling agent for a cationic electrodepositable paint may be obtained by emulsion polymerizing the aforsaid monomer (a) and the following (b-1), (b-2) and (b-3) monomers selected from the aforesaid monomer (b) as the essential components in the presence of a cationic reactive emulsifier containing an allyl group in the molecule.

(b-1) a polymerizable unsaturated vinylsilane monomer containing a vinylic double bond and a hydrolyzable alkoxysilane group;

(b-2) a polymerizable monomer containing a vinylic double bond and a hydroxyl group; and (b-3) the other polymerizable monomer having no carboxyl group selected from the group consisting of a nitrogen-containing alkyl (meth)acrylate monomer, a polymerizable unsaturated amide monomer, a polymerizable unsaturated nitrile monomer, an alkyl (meth)acrylate monomer, a polymerizable unsaturated glycidyl monomer, a polymerizable vinyl aromatic monomer, an alpha-olefin monomer, a diene monomer and vinyl ester monomer of a fatty acid.

The blending ratio of the monomer (a) and the (b-1) to (b-3) monomers is within the following range.

The monomer (a): 1 to 30% by weight, preferably 3 to 20% by weight;

The monomer (b-1): 1 to 30% by weight, preferably 10 3 to 20% by weight;

The monomer (b-2): 1 to 30% by weight, preferably 3 to 20% by weight;

The monomer (b-3): 10 to 97% by weight, preferably 40 to 91% by weight.

As the reactive emulsifier containing an allyl group in the molecule used in this invention, the following compounds are included.

(1) An allyl group-containing anionic reactive emulsifer;

As typical ones, there may be cited a sulfonic acid salt represented by the following general formula (1) or (2)

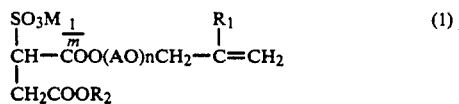

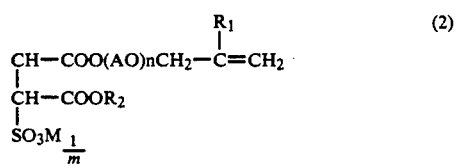

wherein $R_1$ represents a hydrogen atom or a methyl group, $R_2$ represents a hydrocarbon having a hydrocarbon group or a substituent, or an organic group containing an oxyalkylene group, A represents an alkylene group having 2 to 4 carbon atoms or a substituted alkylene group, n is 0 or a positive number, M represents an alkali metal or alkaline earth metal, ammonium, an organic amine salt group or an organic quaternary ammonium salt group, and m is a atomic or ionic valence of M;

or a sulfosuccinic acid diester salt represented by the following general formula (3) or (4)

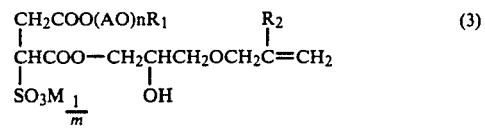

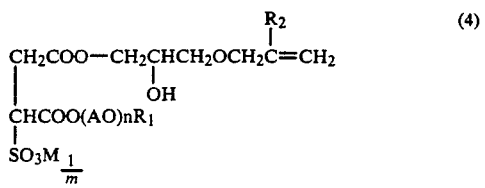

wherein $R_1$ represents a hydrocarbon group optionally having a substituent, a phenyl group, an amino group or a carbocylic acid residue, $R_2$ represents a hydrogen atom or a methyl group, A represents an alkylene group having 2 to 4 carbon atoms, n is an integer of 0 to 100, M represents a univalent or divalent cation, and m is an ionic valence of M;

or a compound represented by the following general formula (5)

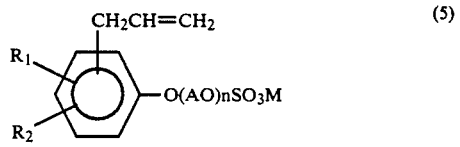

wherein.

$R_1$ represents an alkyl, alkenyl or aralkyl group having 4 to 18 carbon atoms, $R_2$ represents a hydrogen atom or an alkyl an alkenyl or an aralkyl group having a 4 to 18 carbon atoms, A represents an alkylene group having 2 to 4 carbon atoms or a substituted alkylene group, n is an integer of 2 to 200 and M represents an alkali metal atom, $NH_4$ or an alkanolamine residue.

These compounds are known (see, for example, Japanese Patent Publication No. 46291/1974, DE 3317336-A, Japanese Laid-Open Publication No. 221431/1987 and Japanese Laid-Open Patent Publication No. 23725/1988).

These compounds are commercially available under the tradename of "Eliminol JS-2" (Sanyo Chemical Industries, Ltd.), "Ratemuru S Series" (Kao Corporation) and "Aqualon HS Series" (Dai-ichi Kogyo Seiyaku Co., Ltd.).

Of the aforesaid emulsifiers, an anionic reactive emulsifier which is gradually incorporated in the polymer during the polymerization is suitable, and especially so long as it is an anionic reactive emulsifier containing an allyl group which is a group relatively low in reactivity, it is not limited to what is mentioned above only, but it is included within a broad range. And the amount of the anionic reactive emulsifier containing the allyl group used is usually 0.1 to 30% by weight, preferably 0.5 to 5% by weight per 100 parts by weight of the solids content of the finely divided gelled polymer.

(2) An allyl group-containing cationic reactive emulsifier:

A typical example is a reactive emulsifier having a quaternary ammonium salt represented by the following general formula (6)

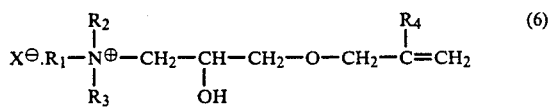

wherein
$R_1$ represents a hydrocarbon group having 8 to 22 carbon atoms optionally having a substituent, $R_2$ and $R_3$ represent an alkyl group having 1 to 3 carbon atoms, $R_4$ represents a hydrogen atom or a methyl group and $X^{\ominus}$ represents a univalent anion.

This compound is known (see Japanese Laid-Open Patent Publication No. 78947/1985) and is commercially available under the tradename of "Ratemuru K-180" (Kao Corporation).

Of the aforesaid emulsifiers, a cationic reactive emulsifier which is gradually incorporated in the polymer during the polymerization is suitable, and if it is a cationic reactive emulsifier containing an allyl group which is a group relatively low in reactivity, it is not limited to what is mentioned above only, but included within a broad range. The amount of the allyl group-containing cationic reactive emulsifier used is usually 0.1 to 30% by weight, preferably 0.5 to 5% by weight per 100 parts by weight of the solids content of the finely divided gelled polymer.

(3) An allyl group-containing nonionic reactive emulsifier:

What is typical of this category is a compound represented by the following general formula (7)

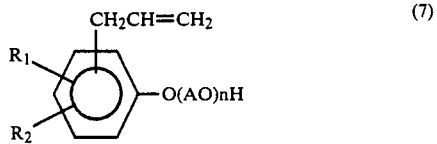

wherein
$R_1$ represents an alkyl, alkenyl or aralkyl group having 4 to 18 carbon atoms, $R_2$ represents a hydrogen atom, an alkyl group, alkenyl group or aralkyl group having 4 to 18 carbon atoms, A represents a alkylene group having 2 to 4 carbon atoms or a substituted alkylene group, and n is an integer of 2 to 200.

This compound is known (see Japanese Laid-Open Patent Publication No. 100502/1087) and commercially available under the trade name of "H-3355N" (Dai-ichi Kogyo Seiyaku Co., Ltd.), Of the aforesaid emulsifiers, a nonionic reactive emulsifier which is gradually incorporated in the polymer during the polymerization is suitable, and if it is a nonionic reactive emulsifier containing an allyl group which is a group relatively low in reactivity, the emulsifier is not limited to what is mentioned above only, but is included within a broad range. In addition, this nonionic reactive emulsifier may be blended at an optional ratio with the anionic reactive emulsifier or the cationic reactive emulsifier, and the blending ratio is properly selected according to the desired characteristics of the finely divided gelled polymer.

The amount of the mixture of the anionic reactive emulsifier or the cationic reactive emulsifier with the nonionic reactive eulsifier used is usually 0.1 to 30% by weight, preferably 0.5 to 5% by weight per 100 parts by weight of the solids content of the finely divided gelled polymer.

As a polymerization initiator used in this invention, a water-soluble azoamide compound represented by the following general formula (8)

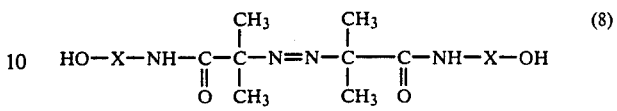

wherein
X represents a linear-chain or branched-chain alkylene group having 2 to 12 carbon atoms, or represented by the following general formula (9)

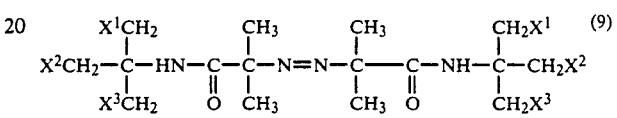

wherein
at least one of $X^1$, $X^2$, $X^3$ represents a hydroxyl group and the remaining represents a hydrogen atom,
is especially suitable.

This compound is known (see Japanese Laid-Open Patent Publications Nos. 218618/1986 and 63643/1986) and is commercially available under the trade name of "VA Series" (Wako Pure Chemicals Industries, Ltd,).

The amount of the polymerization initiator may be usually within the range of 0.1 to 1.5 parts by weight per 100 parts by weight of the solids content of the finely divided gelled polymer.

Copolymerization of the unsaturated monomers (a) and (b) may be carried out by the known process for emulsion polymerization, viz. a process for producing an acryl copolymer. A mixture of the monomers may be reacted in the presence of a polymerization initiator of a water-soluble azoamide compound at a reaction temperature of usually about 50° C. to about 100° C., preferably about 80° C. to about 95° C. for about 1 to about 20 hours, The finely divided gelled polymer of this invention has a solids resin content of usually about 10 to about 40% by weight based on the total amount of its aqueous dispersion. The particle diameter of the finely divided gelled polymer is less than 500 nm, preferably 10 to 300 nm, more preferably 50 to 100 nm. The particle diameter can be adjusted by adjusting the amount and/or the ratio of the amount of the reactive emulsifier having an allyl group in the molecule, and a finely divided gelled polymer having a particle diameter within the desired range can be easily obtained.

The finely divided gelled polymer of this invention is characterized in that the degree of crosslinking and the hardness thereof can be optionally controlled. When the hardness is low, by air drying, the particles are mutually fused to form a continuous coated film, whereby the coated film large in the initial modulus and rich in flexibility can be formed. And when the hardness and the crosslinking density become high, the transparency of the polymer film deteriorates, and many streaks and cracks are brought about, but it is possible to form a uniform, flat coated film by the joint use of a coalescing agent or raising the drying temperature.

The finely divided gelled polymer of this invention can be used per se as a vehicle of an emulsion paint that forms a coated film. Further, since it possesses hydroxyl groups effectively introduced into the polymer by chemical bonding from a water-soluble azoamide compound which is used as a polymerization initiator, the polymer may also be used as a material for an aqueous baking paint to be baked and hardened in admixture with an aminoplast resin such as methylolated melamine resin.

And, when the finely divided gelled polymer is powderized and added to a powder paint, the polymer particles are useful for improving the blocking property and the physical properties of the coated film, and in addition, when dispersed in an aqueous solvent, it remains as primary particle and is less viscous. Accordingly, it is useful as a material for a high-solid type paint as well. Besides, it is possible to mix the polymer with the solvent type paint, water-soluble paint and emulsion paint and use it for improving the properties of such paints.

A cationically electrodepositable finely divided gelled polymer obtained, by this invention, when added to ordinary cationically electrodepositable paint and co-electrodeposited, does not bring about such problems as agglomeration, abnormal electrodeposition and sedimentation, and plays a role of a flow controller at the time when the electrodeposited coated film is thermally hardened, and exhibits an excellent cissing inhibiting effect and the edge covering effect. Again, the coated film forms a microseparating structure and brings about a large improving effect of the physical properties of the coated film.

The reason why the finely divided gelled polymer is stably produced by the emulsion polymerization process of this invention is not necessarily clear at this point in time. However, it is considered attributable to the fact that because a water-soluble azoamide component used as a polymerization initiatior is a very useful polymerization initiator for an emulsion polymerization at a relatively high temperature, even under the polymerization conditions at a relatively high temperature of from about 80° C. to about 95° C., the coagulation of the produced finely divided gelled polymers is inhibited. Also a group having a surface activity is incorporated in the possession of hydroxyl groups effectively introduced to the surface of the polymer by chemical bonding, and that due to the possession of hydroxyl groups effectively introduced to the surface of the polymer by chemical bonding from water-soluble azoamide compound as the polymerization initiator, the affinity of the polymer with water which is a continuous phase is very good, which enables the polymer to be stably present in water.

The following examples will more specifically illustrate this invention. All parts and percentages appearing in the following examples are by weight.

EXAMPLES 1 to 10

A 1-liter flask equipped with a stirrer, a thermometer, a condensing pipe and a heating mantle was charged with deionized water in amounts shown in Table-1 and the emulsifiers shown in Table-1 in amounts shown in Table-1, and the contents were heated with stirring to 90° C., to which 20% of aqueous solutions of 12.5 parts of the polymerization initiator shown in Table-1 dissolved in 500 parts of deionized water was added. After 15 minutes since the addition, 5% of the monomeric mixture shown in Table-1 was added. Then, after further stirring for 30 minutes, the remaining monomeric mixtures and the polymerization initiator began to be added dropwise. The monomeric mixtures and the polymerization initiators were added dropwise over 3 hours and 3.5 hours, respectively. During the period, the polymerization temperature was maintained at 90° C. After dropping of the aqueous solutions of the polymerization initiators, heating was continued for 30 minutes to maintain the temperature at 90° C., then the temperature was lowered to room temperature. The resulting polymers were taken out using a filter cloth the obtain finely divided gelled polymers having the solids content of 20%. The properties of the resulting polymers are shown in Table-2.

COMPARATIVE EXAMPLE 1

Example 1 was repeated except that the charged contents of the 1-liter flask were changed to 3543.1 parts of deionized water and 44.4 parts of an anionic non-reactive emulsifier of "Newcol 271A" (trade name of Nippon Nyukazai Co., Ltd., a 45% aqueous solution) to obtain a finely divided gelled polymer having the properties shown in Table-2.

COMPARATIVE EXAMPLE 2

When emulsion polymerization was carried out as in Example 1, except that the charged contents of the 1-liter flask was changed to 3567.5 parts of deionized water and 20 parts of an anionic vinylic reactive emulsifier of sodium p-styrenesulfonate, while the monomers were being added dropwise, the system agglomerated and a finely divided gelled polymer was not obtained.

COMPARATIVE EXAMPLE 3

When emulsion polymerization was carried out as in Example 1 except that the charged contents of the 1-liter flask were changed to 3567.5 parts of deionized water and 20 parts of an oligoester acrylate type anionic reactive emulsifier of "Newfrontire A-229E" (trade name of Dai-ichi Kogyo Seiyaku Co., Ltd.), while the monomers were being added dropwise, the system agglomerated and a finely divided gelled polymer was not obtained.

COMPARATIVE EXAMPLE 4

According to the same prescription as in Example 7 except that the charged contents of the 1-liter flask were changed to 3555.8 parts of deionized water and a cationic non-reactive emulsifier of "Kotamine 86P Conc" (tradename of stearyl trimethyl ammonium chloride of Kao Corporation, a 63% aqueous solution), a finely divided gelled polymer having properties shown in Table-2 was obtained.

COMPARATIVE EXAMPLE 5

When emulsion polymerization was carried out according to the same prescription as in Example 7 except that the polyerization initiator was changed to a water-soluble azodiamidine compound of "V-50" (2,2-axobis(2-methylpropionamidine)dihydrochloride, a product of Wako Pure Chemicals Industries, Ltd.), while the monomers were being added dropwise, the system agglomerated, and a finely divided gelled polymer was not obtained.

COMPARATIVE EXAMPLE 6

According to the same prescription as in Example 6 except that the following mixture of monomers was used as the monomeric mixture, a finely divided gelled polymer having properties shown in Table-2 was obtained.

| Styrene | 500 parts |
| --- | --- |
| n-Butyl acrylate | 500 parts |

TABLE 1

| | Amount of initially charged deionized water (parts) | Emulsifier Kind *1 | Emulsifier Amount *2 used (parts) |
| --- | --- | --- | --- |
| Example | | | |
| 1 | 3536.5 | JS-2 | 51(20) |
| 2 | 3547.5 | S-120A | 40(20) |
| 3 | 3547.5 | S-120A | 40(20) |
| 4 | 3567.5 | HS-10 | 20(20) |
| 5 | 3557.5 | S-120A/H-3355N | 20/10(10/10) |
| 6 | 3507.5 | K-180 | 80(20) |
| 7 | 3507.5 | K-180 | 80(20) |
| 8 | 3507.5 | K-180 | 80(20) |
| 9 | 3517.5 | K-180 | 120(30) |
| 10 | 3562.5 | K-180/H-3355N | 60/15(15/15) |
| Comparative Example | | | |
| 1 | 3543.1 | N-271A | 44.4(20) |
| 2 | 3567.5 | Sodium p-styrenesulfonate | 20(20) |
| 3 | 3567.5 | A-229E | 20(20) |
| 4 | 3555.8 | 86P | 31.7(20) |
| 5 | 3507.5 | K-180 | 80(20) |
| 6 | 3507.5 | K-180 | 80(20) |

| | Monomer Composition *3 | Monomer Amount used (parts) | Kind of polymerization initiation *4 |
| --- | --- | --- | --- |
| Example | | | |
| 1 | St/nBA/1,6-HDDA | 470/470/60 | VA-086 |
| 2 | St/nBA/1,6-HDDA | 470/470/60 | VA-086 |
| 3 | St/nBA/1,6-HDDA/HEA/MAAC | 450/450/60/20/20 | VA-086 |
| 4 | St/nBA/1,6-HDDA | 470/470/60 | VA-086 |
| 5 | St/nBA/1,6-HDDA | 470/470/60 | VA-086 |
| 6 | St/nBA/1,6-HDDA | 470/470/60 | VA-086 |
| 7 | St/nBA/1,6-HDDA/HEA/KBM-503 | 430/440/40/40/50 | VA-086 |
| 8 | St/nBA/1,6-HDDA/HEA/KBM-503 | 430/440/40/40/50 | VA-080 |
| 9 | MMA/nBA/1,6-HDDA | 470/470/60 | VA-086 |
| 10 | MMA/nBA/1,6-HDDA | 470/470/60 | VA-086 |
| Comparative Example | | | |
| 1 | St/nBA/1,6-HDDA | 470/470/60 | VA-086 |
| 2 | St/nBA/1,6-HDDA | 470/470/60 | VA-086 |
| 3 | St/nBA/1,6-HDDA | 470/470/60 | VA-086 |
| 4 | St/nBA/1,6-HDDA/HEA/KBM-503 | 430/440/40/40/50 | VA-086 |
| 5 | St/nBA/1,6-HDDA/HEA/KBM-503 | 430/440/40/40/50 | V-50 |
| 6 | St/nBA | 50/50 | VA086 |

(NOTE) in Table 1
*1 JS-2: An allyl group-containing anionic reactive emulsifier of a sulfosuccinic acid type (tradename "Eleminol JS-2" of Sanyo Chemical Industries, Ltd., a 39% aqueous solution), S-120A: an allyl group-containing anionic reactive emulsifier of a sulfo-succinic acid type (tradename "Ratemuru S-120A of Kao Corporation, a 50% aqueous solution), HS-10: an allyl group-containing anionic reactive emulsifier of a sulfonic acid type (trade name "Aqualon HS-10" of Dai-ichi Kogyo Seiyaku Co., Ltd., a 100% net product), H-3355N: an allyl group-containing nonionic reactive emulsifier (a product of Dai-ichi Kogyo Seiyaku Co., Ltd., a 100% net product), K-180: an allyl group-containing cationic reactive emulsifier of a quaternary ammonium salt type (trade name "Ratemuru K-180" of Kao Corporation, a 25% aqueous solution, N-271A: an anionic non-reactive emulsifier of a sulfonic acid type (tradename "Newcol 271A of Nippon Nykazai Co., Ltd., a 45% aqueous solution), A-229E: an anionic reactive emulsifier of an oligoester acrylate type (trade name: "Newfrontier A-229E, a 100% net product).
*2 Numerals inside the brackets show the amounts used calculated as the solids contents.
*3 St; styrene, n-BA; n-butyl acrylate, 1,6-HDDA; 1,6-hexanediol diacrylate, HEA; 2-hydroxyethyl acrylate, MAAc; methacrylic acid, KBM-503; gamma-methacryloxypropyltrimethoxy silane, procuced by Shin-Etsu Chemical Co., Ltd. and is commercially available, MMA; methyl methacrylate.

TABLE 1-continued

*4 VA-086; a water-xoluble azoamide polymerization initiator: 2,2'-azobis[2-methyl-N-(2-hydroxyethyl)-propionamide] produced by Wako Pure Chemicals Industries, Ltd. and is commercialy available, VA-080; a water-soluble azoamide polymerization initiator; 2,2'-azobis{2-methyl-N-[1,1-bis-(hydroxymethyl)-2-hydroxyethyl]-propionamide}, produced by Wako Pure Chemicals Industries, Ltd., V-50; a water-soluble azoamidine polymerization initiator, 2,2'-azobis(2-methylpropionamidine)-dihydrochloride, produced by Wako Pure Chemicals Industries, Ltd.

TABLE 2

Properties of finely divided polymer

| | Polymerization stability *5 | Particle diameter (nm) *6 | Diameter of particle dispersed in solvent (nm) *7 | Water-resistance *8 |
|---|---|---|---|---|
| Example | | | | |
| 1 | ◐ | 69 | 82 | ◐ |
| 2 | ◐ | 72 | 82 | ◐ |
| 3 | ◐ | 70 | 85 | ◐ |
| 4 | ◐ | 75 | 86 | ◐ |
| 5 | ◐ | 90 | 98 | ◐ |
| 6 | ◐ | 74 | 80 | ◐ |
| 7 | ◐ | 71 | 85 | ◐ |
| 8 | ◐ | 69 | 80 | ◐ |
| 9 | ◐ | 80 | 83 | ◐ |
| 10 | ◐ | 87 | 93 | ◐ |
| Comparative Example | | | | |
| 1 | ○ | 56 | X | X |
| 2 | X | — | — | — |
| 3 | X | — | — | — |
| 4 | ○ | 65 | X | X |
| 5 | X | X | — | — |
| 6 | ◐ | 80 | 350 | △ |

(NOTE) In Table 2
*5 After polymerization, when the resulting finely divided polymer was filtered through a 100 mesh stainless steel gauze agglomerates remaining on the stainless steel gauze were sufficiently washed with water, then their weights were measured, and the polymerization stability was evaluated by the percentage of the resulting weights to the weights of the charged monomers. When this percentage was a value mentioned on the left side, below, the polymerization stability was evaluated by the mark described on the right side, below.
less than 0.5%: ◐
from 0.5% to 2%: ○
from 2% to 5%: △
more than 5%: X
*6 It was measured by Nanosizer N-4 manufactured by Coulter Co.
*7 After drying the finely divided polymer at 60° C., it was re-dispersed in acetone, and the diameters of particles dispersed in acetone were measured by Nanosizer N-4 manufactured by Coulter Co.
*8 A polymer film produced on a glass sheet was dipped in water, and the whitened state of the film was evaluated according to the following standard.
After lapse of 1 hour, not whitened at all: ◐
After lapse of 1 hour, slightly whitened: ○
Whitened in 10–30 minutes: △
Immediately whitened: X Herein below, application examples wherein the finely divided gelled polymers obtained according to this invention were applied to cationically electrodepositable paints will be shown.

APPLICATION EXAMPLE 1

To 572 parts of a clear emulsion for cationic electrodeposition (tradename "Elecron 9450", a product of Kansai Paint Co., Ltd.) comprising a polyamide-modified epoxy resin and a completely blocked diisocyanate having a solids content of 35% were added 75 parts of a dispersion of the finely divided gelled polymer having a solids content of 20%, a pH of 7 and a viscosity of 90 centipoises obtained in Example 7 and 139.4 parts of the following pigment paste A having a solids content of 43% with stirring, and the resulting mixture was diluted with 588.5 parts of deionized water to obtain a cationically electrodepositable coating.

| | Pigment paste |
|---|---|
| A modified epoxy resin | 5 |
| Titanium oxide | 14 |
| Purified clay | 10 |
| Carbon black | 1 |
| Deionized water | 39.7 |
| Total | 69.7 |

APPLICATION EXAMPLE 2

A cationically electrodepositable coating was obtained as in Application Example 1 except that 75 parts of a dispersion of the finely divided gelled polymer having a solids content of 20%, a PH of 3.8 and a viscosity of 150 centipoises obtained in Example 8 was used as the finely divided gelled polymer.

APPLICATION EXAMPLE 3

A cationically electrodepositable coating was obtained as in Application Example 1 except that 75 parts of a dispersion of the finely divided gelled polymer having a solids content of 20%, of pH of 3.7 and a viscosity of 150 centipoises obtained in Comparative Example 4 was used as the finely divided gelled polymer.

A 0.8×300 ×90 cm cold-rolled dull steel plate (an angle of the edge portion was 45° C.) chemically treated with "Palbond 3030" (a tradename for a product of Nihon Parkerizing Co., Ltd., a zinc phosphate-type) was dipped in each of the cationically electrodepositable coatings obtained in Application Examples 1 to 3, and electrodeposition-coating was conducted using the above plate as a cathode. The conditions of an electrodeposition coating bath were that the temperature was 30° C., pH 6.5 and the voltage 300 V. An electrodeposition-coated film having the thickness of 20 microns (based on a dry film thickness) was formed, then washed with water and baked at 185° C. for 20 minutes. The properties of the coated plates were measured with the results shown in Table-3. Moreover, melt viscosities of the coated plates were also measured and the results are shown in Table-3.

Methods for measuring properties (*9) Melt viscosities of coated films;
The melt viscosity of the electrodepositioncoated film in baking is evaluated from a heat flow appearance of a pencil scratch based on the melt viscosity by a measuring method using a rolling ball (according to JIS-Z-0237). The value is a minimum viscosity (centipoises).

(*10) Covering property of edge surfaces
Electrodeposition coating is conducted on a steel plate having an edge angle of 45° C. under such conditions that a thickness of a cured film in a general portion becomes 20 microns, and the coated steel plate is cured under given baking conditions to prepare a test plate. The test plate is put on a salt spray device such that the edge of the test plate is vertical, and then a salt spray test is continued for 168 hours in accordance with JIS-S-2371. Corrosion resistance of the 45° C. edge portion is evaluated as follows:

◯ Rust does not occur at all
◯ Rust slightly occurs.
x: Rust heavily occurs.

(*11) Smoothness of coated surface:
A finishing property of the electrodepositioncoated surface is evaluated by visual observation.
◯ Good
◉ Nearly good
Δ: Slightly bad (*12) Impact resistance:

Measured in an atmosphere of 20° C. according to JIS K-5400-1979 6, 13, 3B. The value is the maximum height (cm) that does not cause a damage of the coated film under such conditions that a dropped weight is 500 g and a diameter of a rear end of an impact center is ½ inch. The maximum value is 50 cm. (*13) Chipping resistance:

The electrodeposition-coated, baked plate is further coated with a thermosetting intermediate coat and a topcoat and heat-cured. The resulting plate is subjected to the following test.

1) Test device: Q-G-R graveloveter (a device of Q Panel Company)
2) Stones to be air-blasted: ground stone having a diameter of 15 to 20 mm
3) Volume of stone to be air-blasted: about 500 ml
4) Pressure of a blasting air: about 4 kg/cm²
5) Temperature in test: about 20° C.

A test piece is fixed on a test piece holding base, and about 500 ml of ground stones are shot against the test piece at a blasting air pressure of about 4 kg/cm². Thereafter, the condition of the coated surface is evaluated. The condition of the coatd surface is evaluated by visual observation according to the following standard.

◯ (good): A flaw due to shooting is slightly observed on part of the top coat and the electrodeposition-coated film is not peeling off at all.
◉ (slightly bad): A flaw due to shooting is observed on the top coat and the intermediate coat, and the electrodeposition-coated film is slightly peeled off.
Δ (bad): A flaw due to shooting is heavily observed on the top coat and the intermediate coat and the electrodepositioncoated film is notably peeled off.

(*14) Adhesion after dipping in hot water:
After dipping in hot water at 40° C. for 20 days, 106 squares having a size of 1×1 mm are provided on the coated film in accordance with JIS K-5400-1797 6.15, and an adhesive cellophane tape is put on the surface. Said tape is abruptly peeled off and the condition of the coated surface is evaluated.
◯ Good
Δ: An edge of the crosscut is slightly peeled off.
x : Some parts of the 100 squares are peeled off.

TABLE 3

| Test items | Application Example | | |
|---|---|---|---|
| | 1 | 2 | 3 |
| Melt viscosity of a coated film (*9) | 10⁶ | 10⁶ | 10⁵ |
| Covering property of an edge surface (*10) | ◯ | ◯ | ◯ |
| Smoothness of a coated surface (*11) | ◯ | ◯ | Δ |
| Impact resistance (*12) | 50 | 50 | 50 |
| Chipping resistance (*13) | ◯ | ◯ | Δ |
| Andhesion after dipping in | ◯ | ◯ | Δ |
| hot water (*14) | | | |

What is claimed is:

1. A finely divided gelled polymer obtained by emulsion polymerizing
   (a) a polymerizable monomer containing at least two radically polymerizable unsaturated groups in the molecule, and
   (b) a radically polymerizable unsaturated monomer other than the one mentioned in (a), above in the presence of a reactive emulsifier containing an allyl group in the molecule.

2. The finely divided gelled polymer of claim 1 wherein said monomer (a) is selected from the group consisting of a polymerizable unsaturated monocarboxylic acid ester of a polyhydric alcohol, a polymerizable unsaturated alcohol ester of a polybasic acid and an aromatic monomer substituted by at least two vinyl groups.

3. The finely divided gelled polymer of claim 1 wherein said monomer (a) is a polymerizable unsaturated monocarboxylic acid este of a polyhydric alcohol.

4. The finely divided gelled polymer of claim 2 wherein said monomer (a) is at least one member selected from the group consisting of ethylene glycol di(meth)acrylate, triethylene glycol di(meth) acrylate, tetraethyleneglycol dimethacrylate, 1,3-butylene glycol dimethacrylate, 1,4-butanediol diacrylate, neopentyl glycol diacrylate, 1,6-hexanediol diacrylate and divinyl benzene.

5. The finely divided gelled polymer of claim 1 wherein said monomer (b) is selected from the group consisting of a carboxylic acid-containing polymerizable unsaturated monomer, an alkyl ester monomer of (meth)acrylic acid, a polymerizable unsaturated nitrile monomer and a polymerizable vinyl aromatic monomer.

6. The finely divided gelled polymer of claim 5 wherein said monomer (b) is selected from the group consisting of methyl(meth)acrylate, ethyl (meth)acrylate, n-butyl (meth)acrylate, 2-ethylhexyl (meth)acrylate. lauryl (meth)acrylate and styrene.

7. The finely divided gelled polymer of claim 1 wherein the blending ratio of said monomer (a)/said monmer (a) is 1/99 to 99/1 by weight ratio.

8. The finely divided gelled polymer of claim 7 wherein the blending ratio of said monomer (a)/said monomer (b) is 3/97 to 20/80 by weight.

9. The finely divided gelled polymer of claim 1 wherein said allyl grqup-containing reactive emulsifier is an anionic emulsifier, a cationic emulsifier or a mixture of the anionic emulsifier or the cationic emulsifier with a nonionic emulsifier.

10. The finely divided gelled polymer of claim 1 wherein said ally group-containing reactive emulsifier is used in an amount with the range of 0.1 to 30% by weight per 100 parts by weight of the solids content of said finely divided gelled polymer.

11. The finely divided gelled polymer of claim 1 obtained by emulsion polymerizing
    (a) a polymerizable monomer containing at least two radically polymerizable unsaturated groups in the molecule, (b) a radically polymerizable unsaturated monomer consisting of
- (b-1) a polymerizable monomer containing a vinylic double bond and a hydrolyzable alkoxy silane group in the molecule,
- (b-2) a polymerizable monomer containing a vinylic double bond and a hydroxyl group, and
- (b-3) the other polymerizable monomer having no carboxylic group selected from the group consisting of a nitrogen-containing alkyl(meth)acrylate monomer, a polymerizable unsaturated amide monomer, a polymerizable unsaturated nitrile monomer, an alkyl (meth)acrylate monomer, a polymerizable unsaturated glycidyl monomer, a polymerizable vinyl aromatic monomer, an alphaolefin monomer, a diene monomer and a vinyl ester monomer of fatty acid in the presence of a cationic reactive emulsifier containing an allyl group in the molecule.

12. The finely divided gelled polymer of claim 11 wherein the blending ratio of said monomer (a), said monomers (b-1), (b-2) and (b-3) is within the following range on the basis of weight:

| | |
|---|---|
| the monomer (a) | 1 to 30% |
| the monomer (b-1) | 1 to 30% |
| the monomer (b-2) | 1 to 30%, and |
| the monomer (b-3) | 10 to 97%. |

* * * * *